United States Patent
Drochon et al.

(10) Patent No.: US 6,626,991 B1
(45) Date of Patent: Sep. 30, 2003

(54) LOW-DENSITY AND LOW-POROSITY CEMENTING SLURRY FOR OIL WELLS OR THE LIKE

(76) Inventors: Bruno Drochon, 8, Place Georges Pompidou, Noisy le Grand (FR), 93160; Andre Garnier, 15211 Park Row Dr., Houston, TX (US) 77084

( * ) Notice: Subject to any disclaimer, the term of this patent is extended or adjusted under 35 U.S.C. 154(b) by 0 days.

(21) Appl. No.: 10/049,198

(22) PCT Filed: Jul. 6, 2000

(86) PCT No.: PCT/EP00/06459

§ 371 (c)(1),
(2), (4) Date: Jul. 2, 2002

(87) PCT Pub. No.: WO01/09056

PCT Pub. Date: Feb. 8, 2001

(30) Foreign Application Priority Data

Jul. 29, 1999 (FR) .............................. 99 09847

(51) Int. Cl.$^7$ .......................... C04B 38/00; C04B 14/24
(52) U.S. Cl. ..................... 106/672; 106/716; 106/676; 106/677; 106/680; 106/724; 106/732; 106/733; 106/819; 166/293; 166/294
(58) Field of Search ................................ 106/716, 672, 106/676, 677, 680, 424, 732, 733, 819; 166/293, 294

(56) References Cited

U.S. PATENT DOCUMENTS

| 3,804,058 A | * | 4/1974 | Messenger ................. 166/292 |
| 5,121,795 A | * | 6/1992 | Ewert et al. ................ 166/292 |
| 5,125,455 A | * | 6/1992 | Harris et al. ................ 166/292 |
| 5,346,012 A | * | 9/1994 | Heathman et al. .......... 166/293 |
| 5,571,318 A | * | 11/1996 | Griffith et al. .............. 106/725 |
| 6,060,535 A | * | 5/2000 | Villar et al. ................ 166/293 |

FOREIGN PATENT DOCUMENTS

| EP | 0 621 247 A2 | | 10/1994 |
| EP | 0748782 | * | 12/1996 |
| EP | 0814067 | * | 12/1997 |
| EP | 1236701 | * | 9/2002 |
| GB | 2027687 | * | 2/1980 |
| WO | WO 00/50357 | * | 8/2000 |

* cited by examiner

Primary Examiner—Elizabeth D. Wood

(57) ABSTRACT

The invention relates to a cement slurry for cementing an oil well or the like, the slurry having a density lying in the range 0.9 g/cm$^3$ to 1.3 g/cm$^3$, and being constituted by a solid fraction and a liquid fraction, having porosity (volume ratio of liquid fraction over solid fraction) lying in the range 38% to 50%. The solid fraction is constituted by a mixture of lightweight particles, microcement and optionally portland cement and gypsum. Such cements have remarkable mechanical properties due to their very low porosity in spite of having very low density.

27 Claims, No Drawings

LOW-DENSITY AND LOW-POROSITY CEMENTING SLURRY FOR OIL WELLS OR THE LIKE

The present invention relates to drilling techniques for oil wells, gas wells, water wells, geothermal wells, and the like. More precisely, the invention relates to cementing slurries of low density and low porosity.

After an oil well or the like has been drilled, casing or coiled tubing is lowered down the borehole and is cemented over all or part of its height. Cementing serves in particular to eliminate any fluid interchange between the various formation layers that the borehole passes through, preventing gas from rising via the annulus surrounding the casing, or indeed it serves to limit ingress of water into a well in production. Naturally, another main objective of cementing is to consolidate the borehole and to protect the casing.

While it is being prepared and then injected into the well so as to be placed in the zone that is to be cemented, the cementing slurry must present relatively low viscosity and it must have rheological properties that are practically constant. However, once it is in place, an ideal cement would rapidly develop high compression strength so as to enable other work on the well that is being built to start again quickly, and in particular. so as to enable drilling to be continued.

The density of the cement must be adjusted so that the pressure at the bottom of the well compensates at least for the pore pressure in the geological formations through which the well passes so as to avoid any risk of eruption. As well as this lower limit on density, there is also an upper limit. This upper limit is that the hydrostatic pressure generated by the column of cement plus the head losses due to the circulation of the fluids being pumped must remain below the fracturing pressure of the rocks in the section being cemented. Certain geological formations are very fragile and require densities close to that of water or even lower.

The risk of eruption diminishes with column height so the density required for compensating pore pressure is then lower. In addition, cementing a large height of column is advantageous since that makes it possible to reduce the number of sections that are cemented. After a section has been cemented, drilling must be restarted at a smaller diameter, so having a large number of sections requires a hole to be drilled near the surface that is of large diameter, thereby giving rise to excess cost due to the large volume of rock to be drilled and due to the large weight of steel required for the sections of casing, given their large diameters.

All of those factors favor the use of cement slurries of very low density.

The cement slurries in the most widespread use have densities of about 1900 $kg/m^3$, which is about twice the density desired for certain deposits. To lighten them, the simplest technique is to increase the quantity of water while adding stabilizing additives (known as "extenders") to the slurry for the purpose of avoiding particles settling and/or free water forming at the surface of the slurry. Manifestly, that technique cannot get down to a density close to 1000 $kg/m^3$. Furthermore, hardened cements formed from such slurries have greatly reduced compression strength, a high degree of permeability, and poor adhesive capacity. For these reasons, that technique cannot be used to go below densities of about 1300 $kg/m^3$ while still conserving good isolation between geological layers and providing sufficient reinforcement for the casing.

Another technique consists in lightening the cement slurry by injecting gas into it (generally air or nitrogen) before it sets. The quantity of air or nitrogen added is such as to reach the required density. It can be such as to form a cement foam. That technique provides performance that is a little better than the preceding technique since the density of gas is lower than that of water, so less needs to be added. Nevertheless, in oil industry applications density remains limited in practice to densities greater than 1100 $kg/m^3$, even when starting with slurries that have already been lightened with water. Above a certain "quality of foam", i.e. a certain ratio of gas volume to volume of the foamed slurry, the stability of the foam falls off very quickly, the compression strength of the foam after it has set becomes too low, and its permeability becomes too high, thereby compromising durability in a hot aqueous medium which includes ions that are aggressive to a greater or lesser extent for cement.

U.S. Pat. No. 3,804,058 and GB 2,027,687A describe the use of hollow glass or ceramic micro-spheres to produce low density cement slurries for use in the oil and gas industry.

An object of the present invention is to provide cementing slurries that are more particularly adapted to cementing oil wells or the like, having both low density and low porosity, and that are obtained without introducing gas.

According to the invention, this object is achieved by a cement slurry for cementing an oil well or the like, the slurry having a density lying in the range 0.9 $g/cm^3$ to 1.3 $g/cm^3$, in particular in the range 0.9 $g/cm^3$ to 1.1 $g/cm^3$, and being constituted by a solid fraction and a liquid fraction, having porosity (volume ratio of liquid fraction over solid fraction) lying in the range 38% to 50%, and preferably less than 45%.

The solid fraction is preferably constituted by a mixture comprising:

60% to 90% (by volume) of lightweight particles having a mean size lying in the range 20 microns ($\mu$m) to 350 $\mu$m;

10% to 30% (by volume) of micro-cement having a mean particle diameter lying in the range 0.5 $\mu$m to 5 $\mu$m;

0 to 20% (by volume) of Portland cement, having particles with a mean diameter lying in the range 20 $\mu$m to 50 $\mu$m; and 0 to 30% (by volume) of gypsum.

The low porosities achieved make it possible to optimize mechanical properties and permeability. By presenting mechanical properties that are much better than those of conventional lightened systems, and permeabilities that are lower, the leakproofing and adhesion properties of ultralight-weight cement and the resistance of such formulations to chemical attack are thus much better than with the systems presently in use for low densities, even though the invention makes it possible to reach densities that are exceptionally low, and in particular that are lower than the density of water. In addition, slurries of the invention do not require gas, thus making it possible to avoid the logistics that would otherwise be required for manufacturing foamed cements.

The method of the invention is characterized in that particulate additives are incorporated in the cement slurry, such that in combination with one another and with the other particulate components of the slurry, and in particular with the particles of micro-cement (or comparable hydraulic binder), they give rise to a grain-size distribution that significantly alters the properties of the slurry. The said particulate additives are organic or inorganic and they are selected for their low density.

The low density is obtained by combining lightweight particles and cement (or a comparable hydraulic binder). Nevertheless, Theological and mechanical properties will only be satisfactory if the size of the particles and the volume distribution thereof is selected in such a manner as to maximize the compactness of the solid mixture.

For a solid mixture having two components (the lightweight particles and the micro-cement), this maximum compactness is generally obtained for a volume ratio of lightweight particles to micro-cement lying in the range 70:30 to 85:15, and preferably in the range 75:25 to 80:20, for lightweight particles selected to be of a size that is at least 100 times approximately the size of the particles of micro-cement, i.e. in general, particles that are greater than 100 $\mu$m in size. These values can vary, in particular as a function of the greater or lesser dispersion in the grain-size distribution of the lightweight particles. Particles having a mean size greater than 20 microns can also be used, but performance is not so good. Particles greater than 350 microns are generally not used because of the narrow size of the annular gaps to be cemented.

Mixtures having three or more components are preferred since they make it possible to obtain greater compactness if the mean sizes of the various components are significantly different. For example, it is possible to use a mixture of lightweight particles having a mean size of 150 microns, lightweight particles having a mean size of 30 microns, and micro-cement, at a volume ratio lying close to 55:35:10, or departing a little from these optimum proportions, the mixture being constituted by 50% to 60% (by volume) of the first lightweight particles of mean diameter lying in the range 100 $\mu$m to 400 $\mu$m, 30% to 45% of the second lightweight particles of mean diameter lying in the range 20 $\mu$m to 40 $\mu$m, and 5% to 20% of micro-cement. Depending on the application, the fraction of lightweight particles of intermediate size can be replaced by Portland cement of ordinary size, in particular class G Portland cement.

The term "micro-cement" is used in the invention to designate any hydraulic binder made up of particles of mean size of about 3 $\mu$m and including no, or at least no significant number of, particles of size greater than 10 $\mu$m. They have a specific surface area per unit weight as determined by the air permeability test that is generally about 0.8 m$^2$/g.

The micro-cement can essentially be constituted by Portland cement, in particular a class G Portland cement typically comprising about 65% lime, 25% silica, 4% alumina, 4% iron oxides, and less than 1% manganese oxide, or equally well by a mixture of Portland micro-cement with microslag, i.e. a mixture making use essentially of compositions made from clinker comprising 45% lime, 30% silica, 10% alumina, 1% iron oxides and 5% to 6% manganese oxide (only the principal oxides are mentioned here; and these concentrations can naturally vary slightly as a function of the supplier) . For very low temperature applications (<30° C.), Portland micro-cement is preferable over a mixture of micro-cement and slag because of its reactivity. If setting at right angles is required, plaster (gypsum) can be used for all or some of the middle-sized particles.

The lightweight particles typically have density of less than 2 g/cm$^3$, and generally less than 0.8 g/cm$^3$. By way of example, it is possible to use hollow microspheres, in particular of silico-aluminate, known as cenospheres, a residue that is obtained from burning coal and having a mean diameter of about 150 $\mu$m. It is also possible to use synthetic materials such as hollow glass beads, and more particularly preferred are beads of sodium-calcium-borosilicate glass presenting high compression strength or indeed microspheres of a ceramic, e.g. of the silica-alumina type. These lightweight particles can also be particles of a plastics material such as beads of polypropylene.

In general, the density of the slurry is adjusted essentially as a function of which lightweight particles are chosen, but it is also possible to vary the ratio of water to solid (keeping it in the range 38% to 50% by volume), the quantity of micro-cement or of comparable hydraulic binder (in the range 10% to 30%), and adding Portland cement of ordinary size as a replacement for a portion of the lightweight particles.

Naturally, the slurry can also include one or more additives of types such as: dispersants; antifreeze; water retainers; cement setting accelerators or retarders; and/or foam stabilizers, which additives are usually added to the liquid phase, or where appropriate incorporated in the solid phase.

Formulations made in accordance with the invention have mechanical properties that are significantly better than those of foamed cements having the same density. Compression strengths are very high and porosities very low. As a result, permeabilities are smaller by several orders of magnitude than those of same-density foamed cements, thereby conferring remarkable properties of hardness on such systems.

The method of the invention considerably simplifies the cementing operation, since it avoids any need for logistics of the kind required for foaming.

Slurries prepared in accordance with the invention also have the advantage of enabling all of the characteristics of the slurry (rheology, setting time, compression strength, . . . ) to be determined in advance for the slurry as placed in the well, unlike foamed slurries where certain parameters can be measured on the slurry only prior to the introduction of gas (setting time).

The following examples illustrate the invention without limiting its scope.

EXAMPLE 1

Low-density and low-porosity slurries can be obtained from mixtures of particles of two or three (or even more) different sizes, so long as the packing volume fraction (PVF) is optimized.

The properties of three slurries prepared in accordance with the invention are described and compared with those of a conventional low-density extended slurry and of a foamed system:

Slurry A: A mixture of powders was prepared. It comprised 55% by volume of hollow spheres taken from cenospheres having an average size of 150 microns (specific gravity 0.75); 35% by volume of glass microspheres having an average size of 30 microns; and 10% by volume of a mixture of Portland micro-cement and slag having a mean size of about 3 microns.

The microspheres used are sold by 3M™ under the name Scotchlite S60/10,000; such microspheres have a density of 0.6 g/cm$^3$ and a grain-size distribution such that 10% of the particles (by volume) have a size of less than 15 $\mu$m, 50% less than 30 $\mu$m, and 90% less than 70 $\mu$m; these particles were selected in particular because of their high compression strength (90% of the particles withstand isostatic compression of 68.9 MPa or 10,000 psi).

Water and the following additives were mixed with this powder so as to ensure that the volume percentage of liquid in the slurry was 42%: water retainer based on 2-acrylamido 2-methylpropane sulfonic acid (AMPS) at 0.2% (percent by weight of powder, i.e. all of the solid particles taken together (micro-cement, microspheres and cenospheres for this slurry A)); an antifoaming agent at 0.03 gallons per bag of powder; and a super-plasticizer based on polynaphthalene sulfonate at 0.07 gallons per bag of powder. It should be observed that a bag of powder is defined by analogy with bags of cement as being a bag containing 45.359 kg of mixture, in other words 1 gpb=0.03834 liters of additive per kg of mixture.

Slurry B: A mixture of powders was prepared. It comprised 78% by volume of hollow spheres obtained from cenospheres having a mean size of 150 microns and a density of 0.63 g/cm³, and 22% by volume of a mixture of Portland micro-cement and slag having a mean size of about 3 microns.

Water and the following additives were mixed with the powder so that the volume percentage of liquid in the slurry was 42%: water retainer based on AMPS polymer at 0.2% by weight of powder; antifoaming agent at 0.03 gallons per bag of powder; and a super-plasticizer based on polynaphthalene sulfonate at 0.1 gallons per bag of powder.

Slurry C: A mixture of powders was prepared. It comprised 78% by volume of Scotchlite glass microspheres having a mean size of 30 microns, and 22% by volume of a mixture of Portland micro-cement and slag having a mean size of about 3 microns.

Water and the following additives were mixed with said powder so that the volume percentage of liquid in the slurry was 45%: water retainer based on AMPS polymer at 0.2% by weight of powder; an antifoaming agent at 0.03 gallons per bag of powder; and a super-plasticizer based on polynaphthalene sulfonate at 0.145 gallons per bag of powder.

Slurry D: A mixture of powders was prepared. It comprised 78.4% by volume of hollow spheres derived from cenospheres having a mean size of 150 microns (density 0.72 g/cm³) and 21.6% by volume of glass G Portland cement.

Water and the following additive were mixed with said powder so that the volume percentage of liquid in the slurry was 57%: an antifoaming agent at 0.03 gallons per bag of powder.

Slurry E: A conventional slurry of density 1900 kg/cm³ was prepared based on a class G Portland cement.

The slurry was foamed with a quantity of foam of 50% so as to obtain a slurry whose final density was 950 kg/m³.

EXAMPLE 2

For slurries having a density greater than 8 pounds per gallon (ppg), a portion of the lightweight particles can be substituted by class G cement.

Slurry A: A mixture of powders was prepared. It comprised 55% by volume hollow spheres derived from cenospheres having a mean size of 150 microns, 35% by volume of Scotchlite glass microspheres having a mean size of 30 microns, and 10% by volume of a mixture of Portland micro-cement and slag having a mean size of about 3 microns.

Water and the following additives were mixed with the powder so that the volume percentage of the liquid in the slurry was 42%: water retainer based on AMPS polymer at 0.2% by weight of powder; an antifoaming agent at 0.03 gallons per bag of powder; and a super-plasticizer based on polynaphthalene sulfonate at 0.07 gallons per bag of powder.

Slurry B: A mixture of powders was prepared. It comprised 55% by volume of hollow spheres derived from cenospheres having a mean size of 150 microns, 25% by volume of Scotchlite glass microspheres having a mean size of 30 microns, 10% by volume of a class G Portland cement, and 10% by volume of a mixture of Portland micro-cement and slag having a mean size of about 3 microns.

Water and the following additives were mixed with the powder so as obtain a volume percentage of liquid in the slurry of 42%: water retainer based on AMPS polymer at 0.2% by weight of powder; an antifoaming agent at 0.03 gallons per bag of powder; and a super-plasticizer based on polynaphthalene sulfonate at 0.01 gallons per bag of powder.

Slurry C: A mixture of powders was prepared. It comprised 55% by volume of hollow spheres derived from cenospheres having a mean size of 150 microns, 20% by volume of Scotchlite glass microspheres having a mean size of 30 microns, 15% by volume of a class G Portland cement, and 10% by volume of a mixture of Portland micro-cement and slag-having a mean size of about 3 microns.

| Slurry | A | B | C | D | E |
|---|---|---|---|---|---|
| Density | 924 (7.7) | 1068 (8.9) | 1056 (8.8) | 1130 (9.4) | 950 (7.9) |
| Porosity | 42% | 42% | 45% | 57% | 78%* |
| PV | 87 | 68 | 65 | | |
| Ty | 3.7 (7.7) | 8.6 (18) | 3.4 (7.2) | | |
| CS | 11.7 (1700) | 19.3 (2800) | 14.5 (2100) | 2.48 (360) | 4.62 (670) |

The densities are expressed in kg/m³ (and in pounds per gallon in parentheses). Rheology is expressed by a flow threshold Ty in Pascals (and in pounds per 100 square inch in parentheses), and by plastic viscosity in mPas or centipoise, using the Bingham fluid model. These parameters were determined at ambient temperature. CS means compression strength after 24 hours for cement set at 60° C. (140° F.) at a pressure of 6.9 MPa (1000 psi), and it is expressed in Mpa (and in pounds per square inch in parentheses).

* In this case, porosity was calculated as volume of gas+water over total volume of the slurry.

It can be seen that for the slurries prepared in accordance with the invention, compression strength is particularly high for densities that are so low and that these slurries present excellent rheology in spite of their low porosity.

Water and the following additives were mixed with the powder so that the volume percentage of liquid in the slurry was 42%: water retainer based on AMPS polymer at 0.2% by weight of powder; an antifoaming agent at 0.03 gallons per bag of powder; and a super-plasticizer based on polynaphthalene sulfonate at 0.01 gallons per bag of powder.

Slurry D: A mixture of powders was prepared. It comprised 55% by volume of hollow spheres derived from cenospheres having a mean size of 150 microns, 15% by volume of Scotchlite glass microspheres having a mean size of 30 microns, 20% by volume of a class G Portland cement, and 10% by volume of a mixture of Portland micro-cement and slag having a mean size of about 3 microns.

Water and the following additives were mixed with the powder so as to obtain a 10 volume percentage of liquid in the slurry of 42%: water retainer based on AMPS polymer at 0.2% by weight of powder; an antifoaming agent at 0.03 gallons per bag of powder; and a super-plasticizer based on polynaphthalene sulfonate at 0.01 gallons per bag of powder.

Densities are expressed in kg/m$^3$ (and in pounds per gallon in parentheses). Rheology is expressed by the flow threshold Ty in Pascals (and in pounds per 100 square feet in parentheses), and by plastic viscosity PV in mPa.s or centipoise, using the Bingham fluid model. These parameters were determined at ambient temperature. CS stands for compression strength after 24 hours and after 48 hours for cement setting at 60° C. at a pressure of 6.9 MPa (1000 psi), expressed in MPa (and in pounds per square inch in parentheses).

| Slurry | A | B | C | D |
|---|---|---|---|---|
| Density | 924 (7.7) | 1068 (8.9) | 1140 (9.5) | 1218 (10.15) |
| Porosity | 42% | 42% | 42% | 42% |
| PV | 87 | 90 | 100 | 109 |
| Ty | 7.7 | 8.8 | 9.0 | 11.2 |
| CS (24 h) | 7.58 (1100) | 18.3 (2650) | 19.7 (2850) | 20.7 (3000) |
| CS (48 h) | 9.0 (1300) | 19.0 (2750) | 29.7 (4300) | 28.3 (4100) |

Adding Portland cement as a portion of the "medium-sized" particles makes it possible to cover the entire range of densities from 8 ppg to 11 ppg and significantly improves compression strength. This addition does not disturb the good Theological properties in any way.

EXAMPLE 3

For slurries having a density greater than 8 ppg, a portion of the lightweight particles can be substituted by micro-cement or by a mixture of micro-cement and slag.

Slurry A: A mixture of powders was prepared. It comprised 55% by volume hollow spheres derived from cenospheres having a mean size of 150 microns, 30% by volume of Scotchlite glass microspheres having a mean size of 30 microns, and 15% by volume of a mixture of Portland micro-cement and slag having a mean size of about 3 microns.

Water and the following additives were mixed with the powder so that the volume percentage of the liquid in the slurry was 42%: water retainer based on AMPS polymer at 0.2% by weight of powder; an antifoaming agent at 0.03 gallons per bag of powder; and a super-plasticizer based on polynaphthalene sulfonate at 0.07 gallons per bag of powder.

Slurry B: A mixture of powders was prepared. It comprised 55% by volume hollow spheres derived from cenospheres having a mean size of 150 microns, 25% by volume of Scotchlite glass microspheres having a mean size of 30 microns, and 20% by volume of a mixture of Portland micro-cement and slag having a mean size of about 3 microns.

Water and the following additives were mixed with the powder so that the volume percentage of the liquid in the slurry was 42%: water retainer based on AMPS polymer at 0.2% by weight of powder; an antifoaming agent at 0.03 gallons per bag of powder; and a super-plasticizer based on polynaphthalene sulfonate at 0.07 gallons per bag of powder.

| Slurry | A | B |
|---|---|---|
| Density | 990 (8.25) | 1056 (8.8) |
| Porosity | 42% | 42% |
| CS (24 h) | 11.2 (1630) | 21.4 (3100) |
| CS (48 h) | 11.7 (1700) | 22.1 (3200) |

Densities are expressed in kg/m$^3$ (and in pounds per gallon in parentheses). CS means compression strength after 24 hours and 48 hours for cement set at 60° C. under a pressure of 6.9 MPa (1000 psi), expressed in MPa (and in pounds per square inch in parentheses).

Increasing the content of micro-cement and slag mixture gives rise to exceptional compression strength performance at 9 ppg.

EXAMPLE 4

Depending on the desired mechanical properties (flexibility, ability to withstand high pressures), various lightweight particles can be used so long as the PVF is optimized.

Slurry A: A mixture of powders was prepared. It comprised 55% by volume hollow spheres derived from cenospheres having a mean size of 150 microns, 30% by volume of hollow spheres derived from cenospheres having a mean size of 45 microns, and 15% by volume of a mixture of Portland micro-cement and slag having a mean size of about 3 microns.

Water and the following additives were mixed with the powder so that the volume percentage of the liquid in the slurry was 42%: water retainer based on AMPS polymer at 0.2% by weight of powder; an antifoaming agent at 0.03 gallons per bag of powder; and a super-plasticizer based on polynaphthalene sulfonate at 0.07 gallons per bag of powder.

Slurry B: A mixture of powders was prepared. It comprised 55% by volume of particles of polypropylene having a means size of 300 microns, 30% by volume of Scotchlite glass microspheres having a mean size of 30 microns, and 15% by volume of a mixture of Portland micro-cement and slag having a mean size of about 3 microns.

Water and the following additives were mixed with the powder so that the volume percentage of the liquid in the slurry was 42%: a retarder based on purified lignosulfonates at 0.22% by weight of powder; a water retainer based on AMPS polymer at 0.2% by weight of powder; and a super-plasticizer based on polynaphthalene sulfonate at 0.05 gallons per bag of powder.

| Slurry | A | B |
|---|---|---|
| Density | 990 (8.25) | 1068 (8.9) |
| Porosity | 42% | 42% |
| PV | 93 | 116 |
| Ty | 20 | 9.3 |
| CS (24 h) | 18.3 (2640) | 10.3 (1500)* |
| CS (48 h) | 18.7 (2700) | 22.1 (3200)* |

Densities are expressed in kg/m$^3$ (and in pounds per gallon in parentheses). Rheology is expressed by the flow threshold Ty in Pascals (and in pounds per 100 square feet in parentheses), and by plastic viscosity PV in mPa.s or centipoises, using the Bingham fluid model. These parameters were determined at ambient temperature. CS means compression strength at 24 hours and at 48 hours from the cement setting at 60° C. under 6.9 MPa (1000 psi), expressed in MPa (and in pounds per square inch in parentheses).

* Compression strength at 24 hours for cement set at 104° C. (220° F.) under a pressure of 20.7 MPa (3000 psi), expressed in MPa and in psi in parentheses.

EXAMPLE 5

For low temperature applications, the mixture of micro-cement and slag can be substituted by pure micro-cement, or plaster can be added to replace the medium-sized particles.

We have compared a formulation of the invention with a foamed plaster formulation.

Slurry A: A mixture of powders was prepared. It comprised 42.7% by volume of hollow spheres derived from cenospheres having a mean size of 150 microns, 20% by volume of hollow spheres derived from cenospheres having a mean size of 45 microns, 27.3% by volume of gypsum, and 10% by volume of a mixture of Portland micro-cement and slag having a mean size of about 3 microns.

Water and the following additives were mixed with the powder so that the volume percentage of liquid in the slurry was 42%: retarder based on purified lignosulfonates at 0.05 gallons per bag of powder; a water retainer of the example at 0.04 gallons per bag of powder; and an antifoaming agent at 0.03 gallons per bag of powder.

Slurry B (reference): This slurry corresponds to the prior art. A mixture of powders was prepared. It comprised 40% by volume of class G cement and 60% by volume of plaster. Water and additives were mixed with the powder so that the density of the slurry was 1900 kg/m$^3$ (15.8 ppg).

To foam this slurry, entirely conventional wetting agents were added: D138 and F052.1 in a 1:1 ratio. The quantity added depends on foam quality. It was adjusted so as to obtain a slurry having a density of 1320 kg/m$^3$ (11 pounds per gallon).

| Densities | | | 1320 (11) | 1218 (10.15) |
|---|---|---|---|---|
| Slurry A | Q | | | 0 |
| (of the | PV | | | 112 |
| invention) | Ty | | | 6.7 |
| | CS (at 12 hours for cement set at 4° C. under 6.9 MPa) | | | 2.41 (350) |
| | CS (at 24 hours for cement set at 25° C. | | | 14.8 |
| Densities | | | 1320 (11) | 1218 (10.15) |
| | under 6.9 MPa) | | | (2150) |
| Slurry B | Q | | | 30% |
| (reference) | CS (at 24 hours for cement set at 18° C. under atmospheric pressure) | | | 2.96 (430) |
| | CS (at 48 hours for cement set at 18° C. under atmospheric pressure) | | | 4.55 (660) |

Densities are expressed in kg/m$^3$ (and in pounds per gallon in parentheses). Rheology is expressed by the flow threshold Ty in Pascals (and in pounds per 100 square feet in parentheses), and by plastic viscosity PV in mPa.s or centipoises, using the Bingham fluid model.

These parameters were determined at ambient temperature. CS stands for compression strength under conditions stated in the table, expressed in MPa (and in pounds per square inch in parentheses).

What is claimed is:

1. A well cementing slurry, comprising a solid fraction and a liquid fraction and having a density in the range 0.9 g/cm$^3$ to 1.3 g/cm$^3$ and a porosity from about 38% to about 50%, wherein the solid fraction comprises:
    70% to 85% by volume of the solid fraction of a first component comprising particles having a mean size lying in the range 20 microns to 400 microns and a density of less than 2 g/cm$^3$; and
    15% to 30% by volume of the solid fraction of a second component having a mean particle diameter lying in the range 0.5 microns to 5 microns and comprising cement.

2. A cementing slurry as claimed in claim 1, wherein the particles of the first component have approximately at least 100 times the mean particle size of the second component.

3. A cementing slurry as claimed in claim 1, wherein the first component has a mean particle size of greater than 100 microns.

4. A cementing slurry as claimed in claim 1, wherein the second component comprises Portland cement.

5. A cementing slurry as claimed in claim 4, wherein the second component comprises a mixture of Portland cement and microslag.

6. A cementing slurry as claimed in claim 1, wherein the first component comprises particles having a density of less than 0.8 g/cm$^3$.

7. A cementing slurry as claimed in claim 1 wherein the first component comprises at least one particle selected from the group consisting of hollow microspheres, silico-aluminate cenospheres, hollow glass beads, sodium-calcium-borosilicate glass beads, ceramic microspheres, silica-alumina microspheres, plastics materials and polypropylene beads.

8. A cementing slurry as claimed in claim 1, further comprising at least one additive selected from the group consisting of dispersants, antifreezes, water retainers, cement setting accelerators, cement setting retarders and foam stabilizers.

9. A well cementing slurry, comprising a solid fraction and a liquid fraction and having a density in the range 0.9 g/cm$^3$ to 1.3 g/cm$^3$ and a porosity from about 38% to about 50%, wherein the solid fraction comprises:
    50% to 60% by volume of the solid fraction of a first component comprising particles having a mean size lying in the range 100 microns to 400 microns and a density of less than 2 g/cm$^3$;

30% to 45% by volume of a second component comprising particles having a mean size lying in the range 20 microns to 50 microns; and 5% to 20% by volume of the solid fraction of a third component having a mean particle diameter lying in the range 0.5 microns to 5 microns and comprising cement.

10. A cementing slurry as claimed in claim 9, wherein the second component comprises particles having a density of less than 2 g/cm$^3$.

11. A cement slurry as claimed in claim 10, wherein the second component comprises particles having a density of less than 0.8 g/cm$^3$.

12. A cementing slurry as claimed in claim 10 wherein the second component comprises at least one particle selected from the group consisting of hollow microspheres, silico-aluminate cenospheres, hollow glass beads, sodium-calcium-borosilicate glass beads, ceramic microspheres, silica-alumina microspheres, plastics materials and polypropylene beads.

13. A cementing slurry as claimed in claim 9 wherein the second component comprises a cement.

14. A cementing slurry as claimed in claim 13, wherein the cement comprises Portland cement.

15. A cementing slurry as claimed in claim 9, wherein the particles of the first component have approximately at least 100 times the mean particle size of the third component.

16. A cementing slurry as claimed in claim 9, wherein the first component has a mean particle size of greater than 100 microns.

17. A cementing slurry as claimed in claim 9, wherein the third component comprises Portland cement.

18. A cementing slurry as claimed in claim 17, wherein the third component comprises a mixture of Portland cement and microslag.

19. A cementing slurry as claimed in claim 9, wherein the first component comprises particles having a density of less than 0.8 g/cm$^3$.

20. A cementing slurry as claimed in claim 9 wherein the first component comprises at least one particle selected from the group consisting of hollow microspheres, silico-aluminate cenospheres, hollow glass beads, sodium-calcium-borosilicate glass beads, ceramic microspheres, silica-alumina microspheres, plastics materials and polypropylene beads.

21. A cementing slurry as claimed in claim 9, further comprising at least one additive selected from the group consisting of dispersants, antifreezes, water retainers, cement setting accelerators, cement setting retarders and foam stabilizers.

22. A cementing slurry as claimed in claim 9, further comprising 0% to 30% by volume of the solid fraction of gypsum.

23. A well cementing slurry, comprising a solid fraction and a liquid fraction and having a density in the range 0.9 g/cm$^3$ to 1.3 g/cm$^3$ and a porosity from about 38% to about 50%, wherein the solid fraction comprises:

60% to 90%o by volume of the solid fraction of a first component comprising particles having a mean size lying in the range 20 microns to 350 microns and a density of less than 2 g/cm$^3$; and 10% to 30% by volume of the solid fraction of microcement having a mean particle diameter lying in the range 0.5 microns to 5 microns;

0% to 20% by volume of the solid fraction of Portland cement having particles with a mean diameter lying in the range 20 microns to 50 microns; and 0% to 30% by volume of the solid fraction of gypsum.

24. A cementing slurry as claimed in claim 23, slurry has a porosity of less than about 45%.

25. A cementing slurry as claimed in claim 23, wherein the first component comprises particles having a density of less than 0.8 g/cm$^3$.

26. A cementing slurry as claimed in claim 23 wherein the first component comprises at least one particle selected from the group consisting of hollow microspheres, silico-aluminate cenospheres, hollow glass beads, sodium-calcium-borosilicate glass beads, ceramic microspheres, silica-alumina microspheres, plastics materials and polypropylene beads.

27. A cementing slurry as claimed in claim 23, further comprising at least one additive selected from tee group consisting of dispersants, antifreezes, water retainers, cement setting accelerators, cement setting retarders and foam stabilizers.

* * * * *

UNITED STATES PATENT AND TRADEMARK OFFICE
CERTIFICATE OF CORRECTION

PATENT NO. : 6,626,991 B1　　　　　　　　　　　　　　　　　　　　　　　Page 1 of 1
DATED : September 30, 2003
INVENTOR(S) : Drochon et al.

It is certified that error appears in the above-identified patent and that said Letters Patent is hereby corrected as shown below:

Title page,
Item [73], Assignee, should read -- Schlumberger Technology Corporation --
Item [74], *Attorney, Agent, or Firm*, should read -- Catherine Menes, Thomas O. Mitchell and Brigitts Jeffrey --

Signed and Sealed this

Twenty-seventh Day of January, 2004

JON W. DUDAS
*Acting Director of the United States Patent and Trademark Office*

UNITED STATES PATENT AND TRADEMARK OFFICE
CERTIFICATE OF CORRECTION

PATENT NO.   : 6,626,991 B1
DATED        : September 30, 2003
INVENTOR(S)  : Drochon et al.

It is certified that error appears in the above-identified patent and that said Letters Patent is hereby corrected as shown below:

<u>Title page,</u>
Item [73], Assignee, should read -- Schlumberger Technology Corporation --
Item [74], *Attorney, Agent or Firm*, should read -- Catherine Menes, Thomas O. Mitchell and Brigitts Jeffery --

This certificate supersedes Certificate of Correction issued January 27, 2004.

Signed and Sealed this

Thirtieth Day of March, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,626,991 B1 Page 1 of 1
DATED : September 30, 2003
INVENTOR(S) : Drochon et al.

It is certified that error appears in the above-identified patent and that said Letters Patent is hereby corrected as shown below:

<u>Title page,</u>
Item [73], Assignee, should read -- Schlumberger Technology Corporation --
Item [74], *Attorney, Agent or Firm*, should read -- Catherine Menes, Thomas O. Mitchell and Brigitte Jeffery --

This certificate supersedes Certificate of Correction issued March 30, 2004.

Signed and Sealed this

Twenty-fifth Day of May, 2004

JON W. DUDAS
*Acting Director of the United States Patent and Trademark Office*

UNITED STATES PATENT AND TRADEMARK OFFICE
CERTIFICATE OF CORRECTION

| | |
|---|---|
| PATENT NO. | : 6,626,991 B1 |
| APPLICATION NO. | : 10/049198 |
| DATED | : September 30, 2003 |
| INVENTOR(S) | : Bruno Drochon and Andre Garnier |

It is certified that error appears in the above-identified patent and that said Letters Patent is hereby corrected as shown below:

On the Title Page, Item (57)

Abstract: Lines 4-5: Delete "(volume ratio of liquid fraction over solid fraction)"

Col 2 Line 28: Delete "(volume ratio of liquid fraction over solid fraction)"

Col 2 Line 66: "Theological" corrected to --rheological--

Col 4 Lines 1-2: Delete "(keeping it in the range 38% to 50% by volume)"

Col 7 Line 29: "Theological" corrected to "rheological"

Col 11, Line 12, Claim 11: "less than $0.8g/cm^3$ ." corrected to --less than $0.8g/cm^3$.--

Col 27, Line 39, Claim 27: "Selected from tee groups" corrected to --Selected from the groups--

Signed and Sealed this

Sixth Day of November, 2007

JON W. DUDAS
*Director of the United States Patent and Trademark Office*